April 8, 1969     H. V. NORTHROP     3,437,405
LIGHT CONTROL PANEL
Filed Aug. 27, 1964     Sheet _1_ of 2
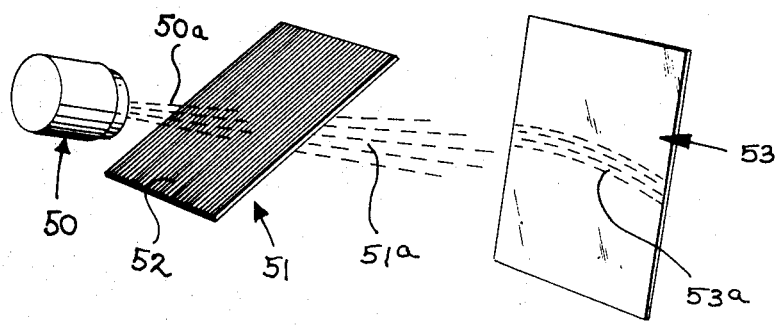
FIG. 8
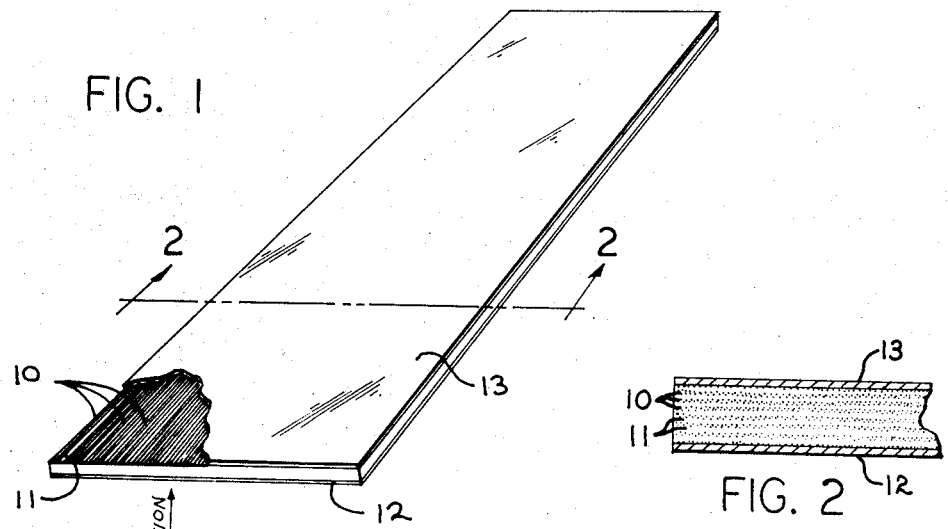
FIG. 1
FIG. 2
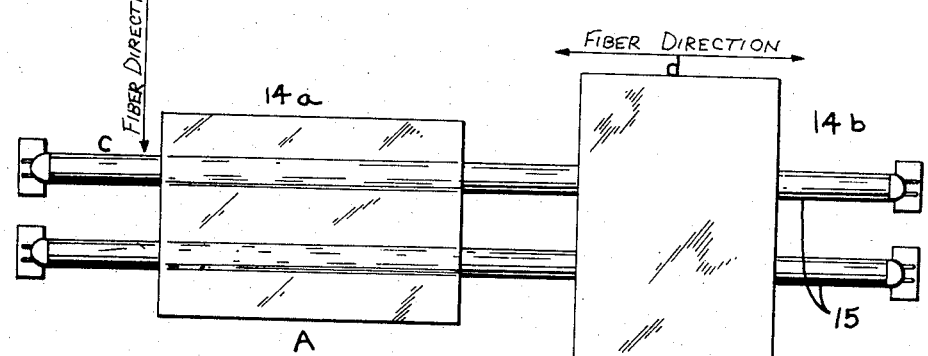
FIG. 3
INVENTOR.
HARRY V. NORTHROP
BY
Staelin & Overman
ATTORNEYS

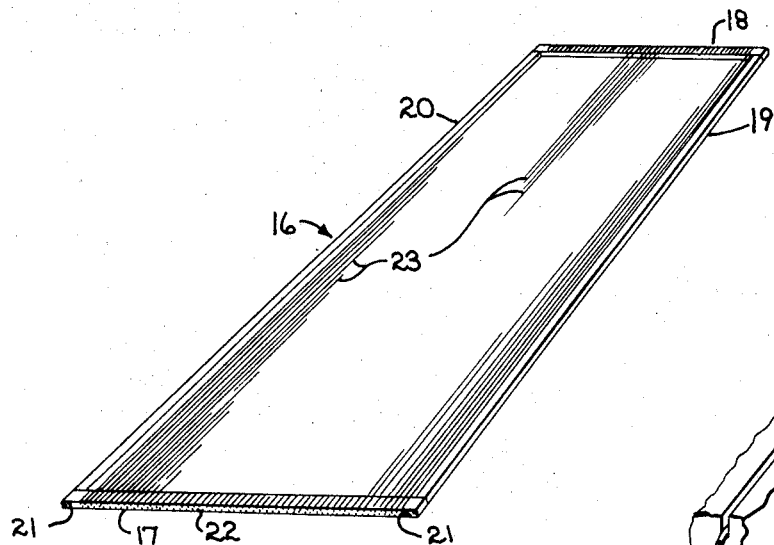
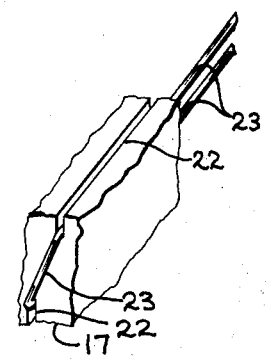
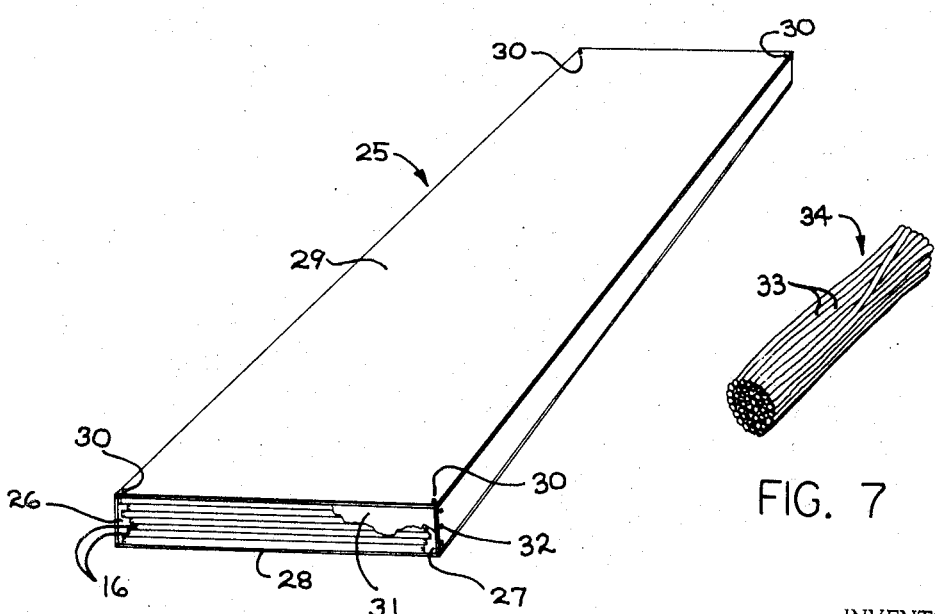

United States Patent Office 3,437,405
Patented Apr. 8, 1969

3,437,405
LIGHT CONTROL PANEL
Harry V. Northrop, Newark, Ohio, assignor to Owens-Corning Fiberglas Corporation, a corporation of Delaware
Continuation-in-part of application Ser. No. 39,837, June 30, 1960. This application Aug. 27, 1964, Ser. No. 392,579
Int. Cl. G02b 17/00, 27/00, 5/14
U.S. Cl. 350—259                                10 Claims

ABSTRACT OF THE DISCLOSURE

A planar, light controlling panel construction adapted to selectively control the transmission and direction of light and like radiation in the passage thereof normally through the panel, said panel construction including a hardened, light-transmitting, resinous binder forming the principal matrix for said panel and, disposed interiorly within said binder, a plurality of light-transmitting, elongate, vitreous bodies disposed in general parallelism with each other and also in parallelism with the major faces of said panel, said vitreous bodies being located and distributed in sufficient number that the path of light passing through the panel must intersect at least one of said bodies whereby the light passing through the panel is effected, depending upon the relationship between the amplitude of light emanating from a light source and the arrangement of the parallel fibers therewithin.

---

This application is a continuation in part of my copending application Ser. No. 39,837, filed on June 30, 1960.

This invention relates to the production of light controlling elements and, more particularly, to a panel which, by virtue of the incorporation therein of vitreous bodies in a particular manner, possesses the property of selectively controlling the passage of light depending upon the angular orientation of the central axis of the panel with respect to the light source wave amplitude.

In various illumination applications, e.g., television, movie and stage lighting, spot lights, head lights, corrugated or flat panels for skylights, decorations, greenhouses and particularly in room illumination when the source of illumination is a series of fluorescent tubes, a need exists for effective, simple, economical control elements effecting the passage of light therethrough in a selective fashion. A number of shielding and diffusion elements are known in the art and these are commonly interposed between the source of illumination and an area to be illuminated in order to diffuse the illumination and to avoid glare and shadows. The electric fixtures carrying the sources of illumination are usually mounted on the ceiling of the room and the shielding and/or diffusion elements are suspended from the ceiling in spaced relation thereto.

Although partial success has been obtained by the use of these elements constructed of various materials and in various configurations, great difficulty has been experienced in the prior art in obtaining an effective predictable control of the light in terms of transmission ranging selectively over a wide range.

It has now been discovered, and the instant invention is based upon such discovery, that a unique light controlling panel can be produced by embedding a plurality of vitreous bodies, such as glass fibers, strands, bundles or rovings in a suitable translucent binder; such vitreous bodies being in general parallel relationship to each other.

It is, therefore, an object of the invention to provide an improved light controlling panel which is light in weight, inexpensive to manufacture and which has novel characteristics in terms of selective light transmissibility ranging from essentially zero to substantially transparent.

Another object of the invention resides in the provision of a solid resinous panel including vitreous fibers or filaments in parallel array whereby light passing therethrough is at least in part selectively polarized, permitting novel desirable achievements in the field of light engineering as relates to light control, etc., as well as to analgous areas of technology.

It is a further object of the invention to provide a light controlling panel comprising a plurality of vitreous filaments supported in spaced, generally parallel relationship by a translucent, adhesive material or binder.

It is also an object of the present invention to provide a panel whose transmissibility with respect to waves of light, as well as other rays (X-rays, gamma rays), depends on the relative angular orientation of the central axis of the panel with respect to the components of vibration of the waves of the ray concerned.

Other objects of the invention will in part be obvious, and will in part appear hereinafter.

For a better understanding of the nature and objects of the invention, reference should be had to the following detailed description and to the attached drawings, in which:

FIGURE 1 is a perspective view, partially broken away, showing one embodiment of a light controlling panel produced in accordance with the invention;

FIGURE 2 is a fragmentary vertical sectional view along the line 2—2 of FIGURE 1, and shown on an enlarged scale;

FIGURE 3 is a schematic plan view showing a pair of fluorescent tubes as observed through two light controlling panels according to the invention;

FIGURE 4 is a perspective view of a frame-like structure for holding a plurality of vitreous filaments in spaced relation during production of a light controlling panel according to the invention;

FIGURE 5 is an enlarged fragmentary view in perspective of the forward, transversely extending segment of the frame-like structure shown in FIGURE 4;

FIGURE 6 is a perspective view, partially broken away, showing a plurality of frame-like structures as shown in FIGURE 4 assembled in a jig, and illustrates one step in a method for producing a light controlling panel according to the invention;

FIGURE 7 is an enlarged view of a single section of a chopped strand or bundle composed of a plurality of individual filaments;

FIGURE 8 is a perspective view of a light controlling panel positioned obliquely to a beam of light and an object screen serving to illustrate the character of the light rays transmitted therethrough.

A new light controlling panel is provided according to the invention. Such light controlling panel comprises a hardened, translucent binder and a plurality of longitudinally extending vitreous bodies, usually glass filaments, strands or bundles of parallel filaments embedded therein; said bodies being disposed in general parallelism with one another, and in such proportion relative to the binder that any light wave passing through the thickness of the panel encounters at least one such body, but an insufficient number thereof to prevent transmission in and of themselves. As a practical matter, any light wave should encounter at least one such body during transmission therethrough. The term "translucent" is used herein in its ordinary sense to include "transparent," and to exclude only "opaque." Further in this sense, the term as used herein designates a light transmitting medium.

The phenomenon of selective transmissibility achieved with the panel of the present invention is amplified where the matrix and embedded bodies are chosen such that the index of refraction of the one component is 0.02 different from the other. This difference can be attained by including bodies having either a higher or lower index of refraction compared to the matrix material.

The binder can be any suitable organic, or inorganic, natural or synthetic adhesive composition. It is necessary that such binder be translucent in order to avoid absorption, by the light controlling panel, of any appreciable portion of transmitted light. Polymers of styrene, vinyls such as vinyl chloride and vinyl acetate, acrylics such as methyl methacrylate, and various polyesters can be mentioned as specific suitable organic binders that are translucent. Silicic acid, magnesium silicate, and silicates of other metals forming oxides, hydroxides and carbonates having a pH not greater than 10.5 can be mentioned as specific suitable inorganic binders. Neither the strength characteristics, within reasonable limits, nor the chemical identity of the binder employed in a light controlling panel according to the invention is of particular importance. The sole function of the binder is to support the vitreous bodies relative to one another. If greater strength than is provided by the binder is required, the light controlling panel can be positioned on a supporting sheet, for example, of glass, cellophane, saran, or other suitable transparent or translucent sheet material, or between two such sheets. Such sheet or sheets can provide the required strength, while the panel according to the invention is selectively and directionally controlling as to light transmitted therethrough.

No greater quantity of the binder should be employed than is necessary to provide sufficient support to the vitreous bodies to maintain proper spacing of the bodies relative to one another. Generally, it has been found that from about 25 percent to about 75 percent of the binder, based upon the total weight of the binder and of the vitreous bodies, is sufficient in this respect. The use of greater percentages of binder than above recited produces unnecessarily thick panels having low light transmission properties. Preferably, from about 35 percent to about 65 percent of the binder, on the indicated basis, is employed.

The terms "percent" and "parts" are used herein, and in the appended claims, to refer to percent and parts by weight, unless otherwise indicated.

The vitreous bodies according to the invention can be hollow or solid glass rods, glass fibers or filaments, strands, rovings or bundles. They may be grouped adjacently to form a flat or multiple layer so long as there is at least one body in any thickness of the panel, but an insufficient number to prevent light transmission in and of themselves. The thickness of vitreous bodies commercially available as fibers or filaments and successfully useable for the present purposes are in the range of from about 0.0001 inch to about 0.005 inch.

The vitreous bodies or the binder employed may be colored or tinted for decorative purposes by the incorporation therein of various color dyes without adverse effect to the light controlling properties of panels constructed therefrom. The length of the vitreous bodies is relatively unimportant with either continuous or short length bodies being satisfactory. The bodies may be stripped of sizing prior to their incorporation in the panels, or may be utilized with the sizing composition still present on the surfaces thereof, with equally satisfactory results.

Referring now to FIGURES 1 and 2 of the drawings, the light controlling panel shown therein, and constituting one embodiment of the invention, comprises a plurality of spaced, generally parallel, longitudinally extending vitreous fibers 10, embedded in a translucent binder 11, such as polyvinyl acetate. Thin, spaced, translucent supporting sheets 12 and 13, e.g., glass or cellophane sheets, are adhered to the top and bottom major surfaces of the panel to provide added strength thereto. As previously noted, such supporting sheets may or may not be employed in a panel according to the invention, sufficient strength being provided by the hardened binder alone for most applications.

FIGURE 3 shows the light controlling effect of a panel in accordance with the invention when interposed between an area to be elluminated and a fluorescent light source. With the panel 14a, interposed as shown in position A in which the unidirectional vitreous fiber pattern, indicated by an arrow C, is perpendicular to the fluorescent tube length 15, the tube outline is clearly seen. However, with identical panel 14b, interposed as shown in position B (rotated 90° from position A) whereby the unidirectional vitreous fiber pattern, indicated by an arrow D, is parallel to the fluorescent tube length, the tube outline cannot be seen, although light passes therethrough. It is, therefore, seen that panels, made in accordance with the invention, possesses utility as a shield for use with fluorescent light sources. In such application, care would be exercised to see to it that the fibers in the panel were aligned parallel to the fluorescent or other longitudinal light source whereby the actual light source could not be seen, though light would be transmitted.

The mechanism by which the just-described phenomenon occurs, apparently by reason of the parallel alignment of the vitreous bodies and also the parallel arrangement with the surfaces of the panel, is not fully understood, but one explanation is that light rays passing through a fiber will be redirected when passed into the fiber in any, but a diametrical, path therethrough. That is, it appears that rays passing in a diametrical path through the fiber, pass therethrough without being deviated from their original direction, whereas those passing at even the slightest offset from a diametrical path are bent upon entrance into the fiber and are reflected on the fiber interior so that, upon emission, therefrom, the original direction is no longer followed. Thus, when a longitudinal source is aligned parallel to a fiber legnth, only a small portion of the light falling on the fiber will pass straight through the fiber, whereas the major portion introduced therein will be redirected.

When a longitudinal light source, however, is aligned at right angles to the fiber, the radial ways extending from each incremental portion of the length of the source in line with a diametrical path through the fiber will pass therethrough and accordingly reveal the location of such incremental portion of the source. A series of immediately adjacent incremental portions of the source passing through corresponding successive, immediately adjacent parallel aligned fibers will thus give definition to the source and reveal its location behind the panel. It appears for this reason that the source is visible when the fibers are aligned at right angles to the source.

Another possible explanation for the phenomenon, illustrated in FIGURE 3 and described hereinabove in connection with FIGURE 3, resides in a consideration of polarization. Thus, in a body or crystal exhibiting polarization properties, the light transmittance therethrough depends upon the geometric attitude or angular relationship between the axis of the body or crystal and the moment of amplitude of the wave vibrations generated and emanating from the source. It is generally accepted that light proceeds as a wave in which the vibrations are perpendicular to the line of propagation. Thus, it would appear that the panel of this invention may be considered as having a polarization axis in common with the parallel vitreous bodies, i.e., fibers, whereby the light proceeding from the horizontal tubes with vertical vibrations is "plane polarized" in the vertical direction parallel with the fibers and the common axis, permitting the outline of the tubes to be seen as in A (FIGURE 3). In contrast, in B (FIGURE 3), the light rays of vertical amplitude are at least partially blocked, since the axis (and fibers) are transverse to the vertical vibrations so that the tube outline is not seen.

FIGURES 4, 5 and 6 illustrate a panel construction incorporating unidirectionally aligned fibers in accordance with this invention as well as a technique for producing same. A frame indicated generally therein at 16 comprises a pair of identically dimensioned, transversely extending segments 17 and 18. The segments 17 and 18 are parallelly spaced and joined at right angles at their respective ends by a pair of spaced, parallel, longitudinally extending side members 19 and 20 to form a rectangular frame structure. The segments 17 and 18 are detachably joined or connected to the members 19 and 20 by any suitable means and in the particular embodiment shown by screws 21. A series of slots 22 is provided along the upper and lower edges of the segments 17 and 18. The slots are equidistantly spaced transversely along the upper and lower edges of the segments 17 and 18, with the slots in the lower edges being disposed in staggered relationship to, and midway between, the slots in the upper surface, and vice versa.

In producing a light controlling panel in accordance with the invention, one end of a continuous length 23 of a vitreous fiber is secured to the frame adjacent one of the slots closest to an end of one of the segments 17 and 18. In the particular embodiment shown, the length 23 of fiber is secured adjacent, and passed through the slot in the upper edge of the segment 17 which is closest to the left end thereof. The fiber is then passed, in sequence, through the longitudinally aligned slot on the upper edge of the segment 18, through the first slot on the lower edge of the segment 18, through the first slot of the lower edge of the segment 17, through the second slot on the upper edge of segment 17, and in such sequence until the fiber has been passed through each slot in the segments 17 and 18. The free end of the fiber length is then secured adjacent the last slot, and cut. Several fiber lengths 23 are wrapped on frames, as shown in FIGURE 4, and a plurality of the frames are then assembled in a jig 25 shown in FIGURE 6.

The jig of FIGURE 6 comprises a pair of identical, spaced, parallel, longitudinally extending side elements 26 and 27 secured at right angles to a base plate 28. The interior surfaces of elements 26 and 27 are step-shaped, and the elements are so positioned relative to one another that the horizontal spacing between each pair of aligned steps equals the width of the frames 16. The vertical distance between adjacent steps equals the height of the frames 16. Because of the steps in the side elements 26 and 27, each of the frames 16, when positioned in the jig 25, is displaced laterally relative to each adjacent frame, above or below, as the case may be, and the fibers in each frame are similarly displaced laterally relative to corresponding fibers in adjacent frames. A cover plate 29 is detachably mounted on the side elements 26 and 27 by any suitable means, such as screws 30. A back plate (not shown) is secured to the side elements 26 and 27 and to the base plate 28 to act as a stop when the frames 16 are inserted in the jig 25. A detachable front plate 31 is also provided and secured to the side elements 26 and 27 and to the base plate 28 after the frames are properly inserted in the jig by a plurality of screws such as that shown at 32.

After the threaded frames have been prepared in the manner previously set forth, and before they have been inserted in the jig 25, a support sheet, e.g., of cellophane, can be positioned upon the base plate 28 if such a sheet is desired in the final panel. If a supporting sheet is not utilized, the interior surface of the base plate 28 can be coated with a silicone grease or other parting agent to prevent the binder material from sticking thereto. A cellophane sheet or silicone grease or the like coating is also provided upon the interior surfaces of the back plate and front plate of the jig 25 to prevent any binder material that may escape through the slots of the frame segments and members from adhering thereto, and upon the interior surfaces of the frame segments 17 and 18, and of the members 19 and 20. The threaded frames are then inserted in the jig 25, as shown in FIGURE 6, except that the top cover 29 is removed, and a liquid binder material is poured into the jig and frame assembly in an amount sufficient to completely fill the space therein. A supporting sheet, e.g., of cellophane, can then be placed over the top of the jig (or again the sheet omitted and the interior surface of top cover 29 coated with a silicone grease) and the top cover secured in place. The assembly is then heated to a suitable temperature and held at such temperature for a sufficient length of time to harden the binder. After the binder has hardened, the panel is complete, and is merely separated from the frames 16 and from the jig 25 and cut into the desired shape.

As will be appreciated, a panel can be produced in the above manner with any desired predetermined cross-sectional arrangement of fibers by merely varying the depth, number, and spacing of the slots, the height of the transversely extending frame segments, the transverse offset of the step-shaped, interior surfaces of the longitudinally extending side elements of the jig, or the number of frames employed. As will further be appreciated, various other methods and means can be utilized to produce the novel light controlling panels of the invention. For example, while employing the same means as shown in FIGURES 4, 5 and 6, the panel can be made in the form of a laminated structure by individually producing a plurality of hardened binder and fiber lamina in frames such as disclosed, and then, after coating the surfaces of the lamina with a suitable adhesive material, inserting the lamina in the jig to provide the position relative to one another desired in the cross-sectional arrangement of the fibers.

Rather than using individual fibers as described in connection with FIGURES 4, 5 and 6, there may be utilized bundles of fibrous glass of the type illustrated in FIGURE 7 wherein individual fibers 33 are grouped in the form of a bundle or strand 34. As can be seen, the fibers 33 are in substantial parallel relationship with each other. In constructing a panel of this invention, the bundles here used are arranged in parallel relationship with each other, as well as the surfaces of the panel. By precoating the fibers with sizing material compatible with the resinous matrix into which it is to be incorporated, impregnation and formation of the panel matrix will be facilitated to permit ready formation of the panel in a continuous process.

In addition to the above, a light controlling panel including unidirectionally oriented filaments according to the invention can also be produced by continuous methods if desired. For example, a plurality of continuous lengths of vitreous fibers can be fed under tension into a bath of a liquid binder and then through a positioning die, having holes or apertures arranged so that the individual fibers, upon passing therethrough, assume the positions relative to one another desired in the final panel. After leaving the die, the coated fibers are advanced over a bottom supporting sheet of cellophane or other suitable material, which sheet is advanced at the same rate as the spaced bindercoated fibers. Edge stops are provided and additional binder, as required, is supplied to completely fill any void spaces that may exist between the continuous lengths of coated fibers. A top supporting sheet can then be applied under slight pressure and the resulting body fed into and through a curing oven of appropriate length. The hardened continuous panel which is produced can then be cut into the desired size by any means well known in the art.

The following example constitutes a practical mode of carrying out the instant invention, and describes the formulation and production of a suitable translucent binder, the method and means employed for spacing the vitreous bodies in predetermined relationship to each other, and the method and means utilized for combining the binder and vitreous bodies to produce a light controlling panel in accordance with the invention.

*Example—Parallel glass filament panel*

A series of identically dimensioned frames 16, as shown in FIGURES 4 and 5, the interior surfaces of the segments 17 and 18 and of the members 19 and 20 comprising the frame having been provided with a thin coating of a silicone grease, are threaded with an continuous length of a glass fiber, 0.001 inch in diameter. The transversely extending segments 17 and 18 of the frames are 10 inches in length and 0.02 inch in height, and have 999 slots 22, the slots being 0.01 inch apart (center line to center line) and 0.001 inch wide. Each slot is 0.005 inch deep, the vertical distance between the bases of the slots being 0.01 inch. The longitudinally extending members 19 and 20 are 24 inches in length and 0.02 inch in height. The base plate 28 of the jig 25 (FIGURE 5) is then covered with a sheet of cellophine (the interior surface of the back plate having been provided with a thin coating of a silicone grease) and seven of the threaded frames are inserted in the jig. The longitudinally extending side elements 26 and 27 of the jig 25 are 24 inches long and 0.14 inch in height, the interior surfaces of the side elements being step-shaped, each step being 0.02 inch in height to correspond to the height of the frame, and 0.002 inch wide. Each frame is, therefore, transversely offset from the frame on either side thereby by 0.002 inch. After the frames are inserted, the front plate 31, the interior surface thereof also having been provided with a thin coating of a silicone grease, is secured to the jig 25.

A binder is then prepared by mixing a quantity of a polyester resin, hereinafter referred to as "Resin A" and subsequently described in detail, with a quantity of styrene monomer and a suitable catalyst in the following proportions:

| | Parts |
|---|---|
| Polyester "Resin A" | 300 |
| Styrene monomer | 30 |
| Benzoyl peroxyde | 6 |

The above composition is then poured into the jig until it completely fills the same, and a sheet of cellophane is placed over the top of the jig and made to adhere to the binder therein. A ring of resilient gasketing material is then placed on the top surfaces of the side elements 26 and 27 of the jig 25 and across the segments 17 and 18 of the topmost frame, and a top plate is then placed over the ring of gasketing material and urged against and secured to the longitudinally extending side plates 26 and 27 of the jig 25.

The jig assembly is then placed in a curing oven and heated to 250°F. for 2½ minutes. The assembly is then removed from the oven, permitted to cool, and the removable front plate 31 and transversely extending segments 17 and 18 in each frame are detached. The hardened and cured panel is then removed from the jig and the longitudinally extending sides of the panel cut to produce a smooth, even surface.

Polyester "Resin A" is prepared by heating a charge consisting of 1.05 mols of ethylene glycol, 0.8 mol of maleic anhydride, 0.2 mol of phthalic anhydride and an amount of hydroquinone equal to 0.4 percent of the charge to a temperature of 230°C. in two hours, and holding the charge at a temperature between 230°C. and 235° C. for five additional hours. An 80 part portion of the resulting reaction product, which is an unsaturated, polymerizable polyester, is mixed with 20 parts of methylmethacrylate monomer, and a 75 part portion of the resulting mixture is blended with 50 parts of styrene monomer, 0.3 part of vinyldimethoxyethoxysilane, and 1.8 parts of benzoyl peroxide, using a suitable driven propeller for agitation until a uniform composition is achieved.

Referring now to FIGURE 8, the unique light controlling character of the panel of the present invention is further illustrated. Reference numeral 51 identifies a panel of the present invention. The panel includes a solid resinous binder matrix having a formulation as described in the foregoing example. Parallel glass fibers 52 are disposed in parallel relationship within the matrix binder and also parallel to the opposed planar faces of the panel. The panel is constructed in the manner described earlier herein. The panel 51 is arranged between a light source 50, generating a focused beam 50a, normal to object screen 53. The panel is tilted on its horizontal axis so that the focused beam 50a strikes it obliquely. The light rays 51, after passing through the panel 51, describe an arc of light 53a on the object screen, demonstrating a novel transmitting phenomenon.

From all of the foregoing description, it can be seen that there has been provided a panel of unique light controlling properties. Many uses of the panel will be suggested from the foregoing including the use thereof as a shield, reflector, diffusion member, light deflector, etc. Use of a plurality of panels in superimposed relationship permits a wide variety of light controlling effects useful in the building industry where light transmitting panels of selective character are widely in demand. Additionally, use of a plurality of panels, some parallel and some in oblique relationship, permits unusual combinations. The phenomenon illustrated in FIGURE 8 suggests a use in stage lighting for selective illumination of a stage, amphitheater or the like.

While the present invention has been described herein as primarily constituting a structural panel, it is, of course, permissible to consider the utilization of the solid matrix with fibers in parallelism embedded therein as described, as a unitary lens element for use alone, with like elements or with other available lens elements and system. In such case, the lens blank can be fabricated from panel stock followed by precision grinding of the panel faces.

While the panel and its use have been disclosed and discussed herein in connection with light rays, it will be apparent that the directional control of other rays by radiation is within the normal purview and scope of the present invention. The inherent low cost of these panels and their properties achieved by the constructional details outlined herein suggest their utilization in the control of a host of other rays emanating from a source, e.g., invisible light such as ultraviolet and infrared, as well as X-rays, gamma rays, and the like. With the latter, it is considered that shielding accomplished by directional control using the panels of this invention can, in many cases, be accomplished more economically than by using dense absorbing shields.

The important features of the present invention include the following, though not necessarily in the order of their importance. The fibers, strands or bundles of fibers are preferably vitreous and, most preferably, a clear transparent glass, although for decorative effects other fibers of less transparency may be utilized.

The fibers, strands and/or bundles of fibers should be in parallel relationship with each other and the surfaces of the panel. The fibers, strands and/or bundles should be sufficient in proportion, taken in conjunction with the thickness of the panel, that any light wave or other ray, proceeding therethrough, encounters or is intercepted by at least one such fiber, although the proportion should not be of a quantity as to prohibit transmission.

While what are considered to be the more advantageous embodiments of the invention have been described, it is obvious that many modifications and variations can be made in the compositions and specific procedures discussed without departing from the spirit and scope of the present invention, as those skilled in the art will readily understand. Such modifications and variations are considered to be within the purview and scope of the invention, as defined by the appended claims.

I claim:
1. A planar, light controlling panel having opposed major faces and an interior structure therebetween, said panel controlling the transmission and direction of light, and like radiation, which falls on one of said major faces, passes through said interior and proceeds from the other of said faces, said panel including:
- a hardened, light-transmitting, resinous binder forming the principal light-transmitting matrix and constituting the interior of said panel and
- a plurality of light transmitting, elongate, vitreous bodies embedded within said matrix in general parallelism with each other and said major faces of said panel, said vitreous bodies being located and distributed in sufficient number that the path of light striking one of said major faces and passing through the panel interior must intersect at least one of said bodies, said panel when exposed to an elongated light source arranged in parallel relationship with said elongate vitreous bodies transmitting the light from said source in a non-oriented fashion, but when exposed to an elongated light source arranged in perpendicular relationship with said elongate vitreous bodies transmitting said light in such fashion that the outline of said elongated light source is readily discernible.

2. A panel construction as claimed in claim 1, wherein the location and number of said vitreous bodies causes light and like radiation leaving said panel to be altered to a degree dependent upon the angular orientation of the central axis of the panel with respect to the wave amplitude of the source of said light and like radiation.

3. A panel as claimed in claim 1, wherein said light transmitting, elongate, vitreous bodies are glass filaments extending between opposed parallel edges of said panel.

4. A panel as claimed in claim 1, wherein said filaments and said matrix have a different index of refraction.

5. A panel as claimed in claim 4, wherein the difference is at least about 0.02.

6. A panel as claimed in claim 5, wherein the index of refraction of the matrix is greater.

7. A panel as claimed in claim 5, wherein the index of refraction of the matrix is less.

8. In combination, a plurality of panels as claimed in claim 1, said panels being combined so that the elongate vitreous bodies are in oblique relationship.

9. A panel as claimed in claim 1, wherein a proportion of said elongate vitreous bodies are located in general parallelism with each other and the major faces of said panel but not with the remainder of said elongate vitreous bodies.

10. In combination, a radiation source and, mounted in spaced covering assembly therewith, a panel as claimed in claim 1.

References Cited

UNITED STATES PATENTS

| 3,068,753 | 12/1962 | Kirkpatrick | 350—263 |
| 3,125,013 | 3/1964 | Herrick et al. | 95—75 |
| 3,188,188 | 6/1965 | Norton. | |
| 631,220 | 8/1899 | Manning | 350—263 |
| 2,011,252 | 8/1935 | Modigliani. | |
| 2,943,968 | 7/1960 | Freeman et al. | |

FOREIGN PATENTS

| 227,504 | 8/1959 | Australia. |

JULIA E. COINER, *Primary Examiner.*

U.S. Cl. X.R.

350—96, 126, 263; 240—01, 106